(12) United States Patent
Kim et al.

(10) Patent No.: US 11,709,306 B2
(45) Date of Patent: Jul. 25, 2023

(54) ROLLABLE BACK SHEET FOR LIGHT EMITTING DEVICE AND LIGHT EMITTING DEVICE USING SAME

(71) Applicant: EZ GROUP Inc., Hanam-si (KR)

(72) Inventors: Joo Young Kim, Hanam-si (KR); Ji Won Kang, Seongnam-si (KR)

(73) Assignee: EZ GROUP INC., Hanam-si (KR)

( * ) Notice: Subject to any disclaimer, the term of this patent is extended or adjusted under 35 U.S.C. 154(b) by 0 days.

(21) Appl. No.: 17/669,612

(22) Filed: Feb. 11, 2022

(65) Prior Publication Data

US 2022/0268985 A1 Aug. 25, 2022

Related U.S. Application Data

(63) Continuation of application No. PCT/KR2021/018621, filed on Dec. 9, 2021.

(30) Foreign Application Priority Data

Feb. 25, 2021 (KR) .......................... 10-2021-0025688

(51) Int. Cl.
*F21V 8/00* (2006.01)

(52) U.S. Cl.
CPC ......... *G02B 6/0043* (2013.01); *G02B 6/0065* (2013.01)

(58) Field of Classification Search
CPC .. G02B 6/0043; G02B 6/0065; G02B 6/0055; G02B 6/005
See application file for complete search history.

(56) References Cited

FOREIGN PATENT DOCUMENTS

| CN | 102918435 A | * | 2/2013 | ............ F21K 9/232 |
|----|----|----|----|----|
| JP | H0926575 A | | 1/1997 | |
| KR | 200270488 Y1 | | 4/2002 | |
| KR | 200453058 Y1 | | 4/2011 | |
| KR | 1020120017340 A | | 2/2012 | |
| KR | 101269666 B1 | | 5/2013 | |
| KR | 20180005787 | | 1/2018 | |
| KR | 20180042505 | | 4/2018 | |
| KR | 20200102609 A | | 9/2020 | |

* cited by examiner

*Primary Examiner* — Karabi Guharay
(74) *Attorney, Agent, or Firm* — Cantor Colburn LLP

(57) ABSTRACT

Provided are a rollable back sheet for a light emitting device and a light emitting device using the same. The rollable back sheet includes a base film and a light guide pattern formed on the base film, and capable of blocking air from flowing into a gap between a release paper and the base film manufactured to have a line printing portion that completely adheres the base film to the release paper, thereby preventing the release paper and the base film from being separated from each other even when the base film is produced, distributed, stored, and used in a roll form and thus enabling long-term storage of the back sheet.

4 Claims, 18 Drawing Sheets

ROLLABLE BACK SHEET FOR LIGHT EMITTING DEVICE AND LIGHT EMITTING DEVICE USING SAME

TECHNICAL FIELD

The present disclosure relates to a rollable back sheet for a light emitting device and a light emitting device using the same. More particularly, the present disclosure relates to a rollable back sheet for a light emitting device and a light emitting device using the same, the rollable back sheet including a base film and a light guide pattern formed on the base film, and capable of blocking air from flowing into a gap between a release paper and the base film manufactured to have a line printing portion that completely adheres the base film to the release paper, thereby preventing the release paper and the base film from being separated from each other even when the base film is produced, distributed, stored, and used in a roll form and thus enabling long-term storage of the back sheet. In addition, when the base film is needed to be used in an unrolled form, the base film is easily unrolled and spread out due to the unique multi-layered structure thereof and thus is easy to cut and attach.

BACKGROUND ART

In general, a back sheet for a display device is formed by laminating various types of laminated films or composite films, such as a reflective film, a light guide film, a diffusion film, a prism sheet, etc.

In this case, a light guide film or light guide panel is a member that provides a path for light emitted from a light source to uniformly scatter and diffuse, and is applied to a light-receiving type flat panel display device such as a liquid crystal display device, or a surface light source device used for a lighting signboard.

As a conventional technology related thereto, there is Korean Utility Model Registration No. 20-0270488, entitled "SHEET FOR LCD BACKLIGHT GUIDE PANEL".

The conventional technology is characterized by producing an acrylic light guide panel by the following steps: adhering a dry film on a SUS sheet; placing pattern film on the dry film, followed by performing exposure; developing and etching exposed SUS sheet; removing the films on the SUS sheet to obtain a pattern sheet with an engraved pattern; and placing pattern sheet in a mold and then injecting a resin into the mold to form the acrylic light guide panel. An advantage is that light guide panels can be repeatably produced, thus improving productivity, are effective in production cost reduction, and have excellent reproducibility.

As another conventional technology, there is Korean Patent Application Publication No. 10-2012-0017340, entitled "DIFFUSION SHEET AND LIGHT GUIDE PANEL WITH IRREGULAR PATTERN, BACK LIGHT UNIT COMPRISING THE SAME, AND METHOD FOR MANUFACTURING THE SAME". This technology is characterized by providing a diffusion sheet including: a transparent synthetic resin sheet body; and an irregular pattern formed in parallel on at least one surface of the body, and composed of a plurality of discontinuous linear grooves for diffusing or focusing light. An advantage is that defects caused by scratches and foreign substances that may occur in a manufacturing process can be significantly reduced, and light diffusion and luminance can be improved.

As another conventional technology, there is a Korean Utility Model Registration No. 20-0453058, entitled "REFLECTION SHEET WITH LIGHT GUIDANCE PATTERN".

The technology is characterized by providing a reflection sheet with a pattern for guiding light emitted from a light source, thereby reducing the production cost of backlight units while improving the luminance and illuminance uniformity.

As described above, various technologies for a light guide sheet or a light guide panel to improve luminous intensity, luminance, illuminance, etc. have been proposed. However, the proposed technologies are problematic in that when attaching and detaching a light guide sheet (back sheet), a pattern of the back sheet attached to a light transmitting panel is smeared, requiring a high skill of workers, and causing major complaints from consumers. Thus, the need exists for solutions to the problems addressed above.

In addition, in manufacturing the back sheet, when a release paper is used to protect a light guide pattern printed on the sheet, the sheet is stored in a roll form and is supplied to a sheet feeding device so as to minimize space and increase work efficiency. In particular, when the back sheet to which the release paper for pattern protection is adhered is rolled, the edge of the back sheet tends to be bent, causing separation between the release paper and the back sheet. As air flows into a gap therebetween, an adhesive solution hardens or dries, causing a problem in that the adhesive strength is lowered during practical use, resulting in increasing the defective rate of products.

DISCLOSURE

Technical Problem

Accordingly, the present disclosure has been made keeping in mind the above problems occurring in the related art.

An objective of the present disclosure is to provide a rollable back sheet for a light emitting device, the rollable back sheet including a base film and a light guide pattern formed on the base film, and capable of blocking air from flowing into a gap between a release paper and the base film by forming a line printing portion that completely adheres the base film to the release paper.

More particularly, the rollable back sheet blocks air from flowing into the gap between the base film and the release paper, thereby preventing the base film and the release paper from being separated from each other even when the base film is produced, distributed, stored, and used in a roll form and thus enabling long-term storage of the back sheet.

Particularly, the line printing portion is formed using ink mixed with an adhesive as in the case of a light guide pattern, and is printed so as not to have the light guide pattern thereon, thereby further improving adhesive strength and increasing manufacturing convenience.

Another objective of the present disclosure is to provide a rollable back sheet for a light emitting device, in which a base film is configured in a multi-layered structure so as to be easily unrolled and spread out.

Still another objective of the present disclosure to provide a light emitting device using the rollable back sheet.

Technical Solution

In order to accomplish the above objectives, an aspect of the present disclosure provides a rollable back sheet including:

a base film;

a light guide pattern repeatedly formed on the base film by printing with luminescent ink mixed with an adhesive, thereby having adhesiveness; and a line printing portion formed on the base film and configured to adhere the base film to a release paper.

Another aspect of the present disclosure provides a light emitting device using the rollable back sheet, the light emitting device including:

a frame;

a light transmitting panel provided on the frame, having a pattern portion, and provided with the back sheet having a light guide pattern on a surface thereof;

a light emitting unit provided in the frame and composed of a printed circuit board (PCB) and a light emitting member configured to emit light to a side surface of the light transmitting panel; and a cover detachably provided on the frame.

Advantageous Effects

A rollable back sheet for a light emitting device according to the present disclosure and a light emitting device using the same has the following effects.

Light guide patterns are repeatedly formed on a surface of the base film, especially the reflective film, so as to be spaced apart from each other, and these patterns are formed by printing with luminescent ink mixed with an adhesive, thereby having adhesiveness. In the case of attaching the back sheet to the light emitting device, especially a light transmitting panel constituting a display (signboard, guide board, etc.) or a surface lighting device, the back sheet can be attached by being simply pressed, thereby dramatically improving productivity.

In addition, in manufacturing the base film, an adhesive line printing portion is further configured to prevent separation between a release paper protecting the light guide pattern and the base film, thereby solving the problem of lowering adhesive strength due to air flowing into a gap between the release paper and the base film and thus enabling long-term storage of the back sheet.

In addition, the base film is configured in a multi-layered structure, so that when the base film is needed to be used in an unrolled form, the base film can be easily unrolled and spread and thus is easy and attach.

Furthermore, by improving the luminescent ink mixed with the adhesive for printing the light guide pattern, the adhesiveness is maintained even when the back sheet is repeatedly attached and detached, and the pattern of the back sheet attached to a light transmitting panel is not smeared, thereby dramatically increasing workability and quality. Also, the light guiding performance can be maintained even when the back sheet is attached to another back sheet, and it is possible to produce both a dot-type light guide pattern that has to correspond to the orientation of a light source, and a grid-type light guide pattern that has nothing to do with the orientation of the light source.

Furthermore, the line printing portion extends from the light guide pattern or is formed adjacent to the edge of the light guide pattern so that it can be printed together therewith, thereby improving work convenience, simplifying the manufacturing process, and shortening the manufacturing time.

Figure 1A:
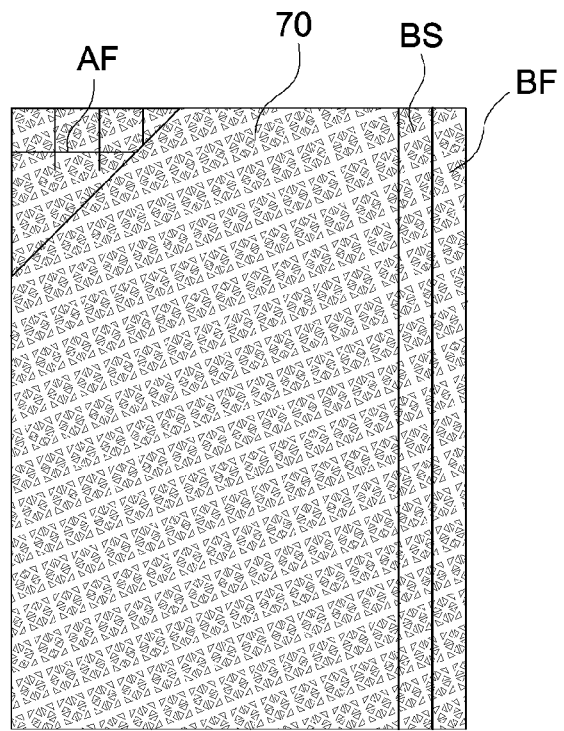
FIGS. 1A, 1B and 1C are detailed views illustrating a line printing portion of a rollable back sheet for a light emitting device according to the present disclosure.
Figure 1B:
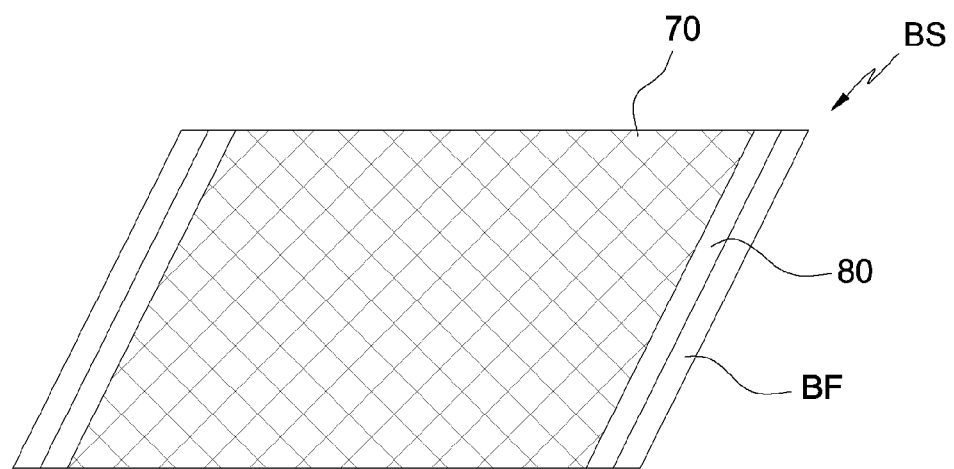
Figure 1C:
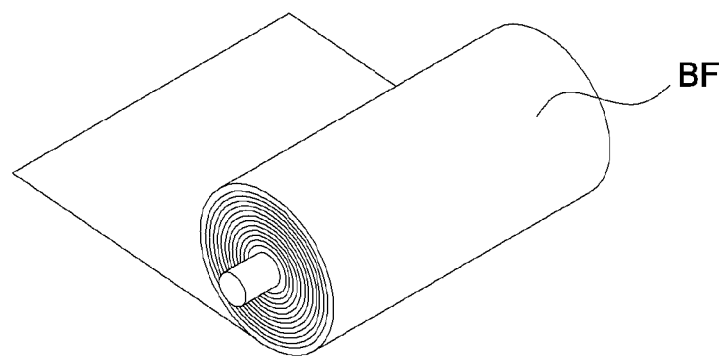

*Description of the Reference Numerals in the Drawings*

| | |
|---|---|
| B: back sheet | |
| L1, L2: light guide pattern portion | Dh: high-density |
| D$\ell$: low-density portion | BF: base film |
| 10: frame | 11: frame piece |
| 12: bracket receiving portion | |
| 121: anti-separation portion | |
| 13: fixing bracket | 131: headless bolt |
| 14: fixing portion | |
| 15: width extension portion | |
| 16: panel seating portion | |
| 18: first coupling portion | |
| 181 first pillar | 182: head |
| 19: second coupling portion | 191: second pillar |
| 192 locking portion | |
| 192a: inclined portion | |
| 20: light transmitting panel | |
| 21: anti-light leakage member | |
| 30: light emitting unit | |
| 31: light emitting member | |
| 33: PCB | 331: cable |
| 332: jack | |
| 40: cover | 41: cover piece |
| 48: first corresponding coupling portion | |
| 481 anti-separation protrusion | |
| 49: second corresponding coupling portion | |
| 491: third pillar | |
| 492: corresponding locking portion | |
| DS: light blocking member | |
| SA: auxiliary adapter | SA1: terminal portion |
| MC: main cable | VT: attachment member |
| 70: light guide pattern | 70L: pattern contour |
| 73a: corner portion | 73b: side portion |
| P: bonding device | P1: pressing drum |
| P2: table | |

BEST MODE

Hereinafter, the present disclosure will be described in detail with reference to the accompanying drawings.

The present disclosure will now be described in detail based on aspects (or embodiments). The present disclosure may, however, be embodied in many different forms and should not be construed as being limited to only the embodiments set forth herein, but should be construed as covering modifications, equivalents or alternatives falling within ideas and technical scopes of the present disclosure.

In the figures, like reference numerals, particularly, reference numerals having the same last two digits or the same last two digits and letters refer to like elements having like functions throughout, and unless the context clearly indicates otherwise, elements referred to by reference numerals of the drawings should be understood based on this standard.

Also, for convenience of understanding of the elements, in the figures, sizes or thicknesses may be exaggerated to be large (or thick), may be expressed to be small (or thin) or may be simplified for clarity of illustration, but due to this, the protective scope of the present disclosure should not be interpreted narrowly.

The terminology used herein is for the purpose of describing particular aspects (or embodiments) only and is not intended to be limiting of the present disclosure. As used herein, the singular forms are intended to include the plural forms as well, unless the context clearly indicates otherwise. It will be further understood that the terms "comprises" and/or "includes", when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

As illustrated in FIGS. 1A to 4, a rollable back sheet BS for a light emitting device according to the present disclosure largely includes a base film BF, a light guide pattern 70 repeatedly formed on the base film BF, and a line printing portion 80 formed on the base film BF.

In the case of a side light emission-type light emitting device, the base film BF is particularly preferably a reflective film. It is preferable that the reflective film effectively reflects light emitting from a light source to the back sheet BS (reflection performance is determined by mirror reflectivity) and can be used as a back surface protective film of the light emitting device. Furthermore, there may be employed a known reflective film that re-reflects diffused light leaking from the back sheet BS back to the back sheet BS, allowing light traveling in parallel through the back sheet BS to travel in a direction perpendicular to a panel to escape from the light guide sheet.

The base film BF or reflective film preferably has flexible properties for workability, but when unfolding the rollable base film BF, in order to increase smoothness and facilitate cutting and attachment, the base film is preferably composed of a first layer made of polypropylene (P.P), a second layer provided on a surface of the first layer and made of polyethylene terephthalate (PET), and a third layer provided on a surface of the second layer and made of P.P, which is the same material as the first layer.

The first to third layers may be laminated and molded using methods such as compression, adhesion, etc., but other methods may also be used without departing from the scope of the present disclosure.

Figure 5:
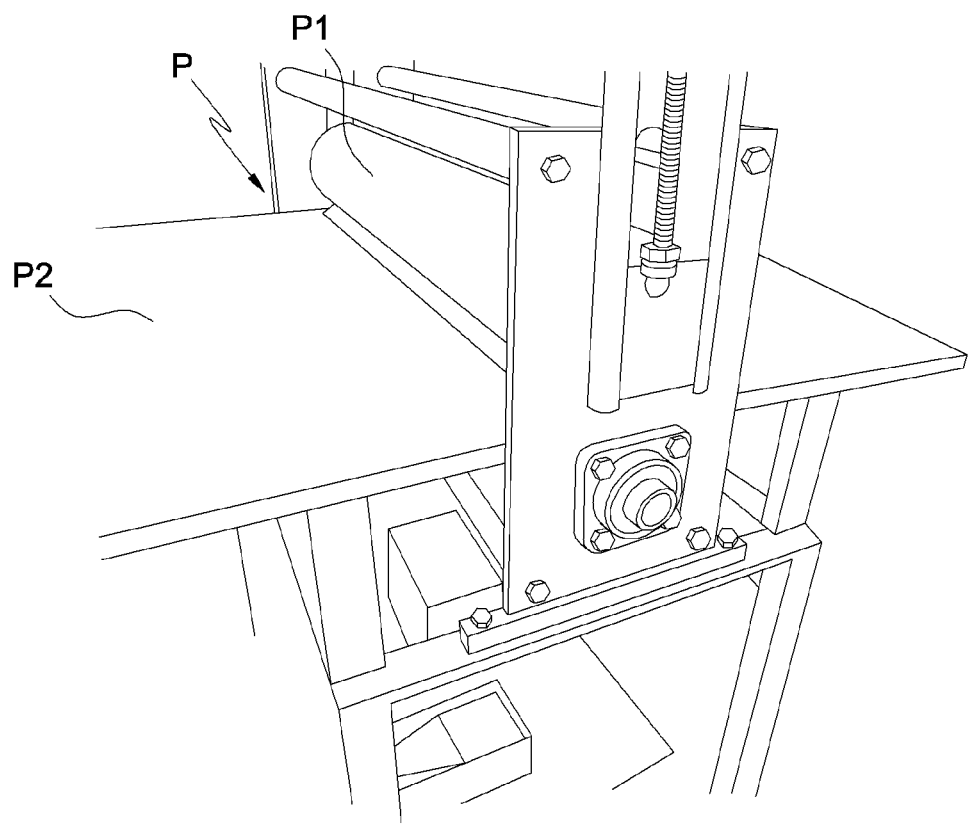
FIG. 5 is a view illustrating a bonding device used in the rollable back sheet for the light emitting device according to the present disclosure.

The light guide pattern 70 formed on the base film BF is formed by a printing method using a luminescent ink mixed with an adhesive, and a pattern forming surface of the base film BF has adhesiveness imparted by the adhesive. Thus, when attaching the base film BF to a light transmitting panel for the manufacture of a light emitting device, the base film BF is easily attached to the light transmitting panel by simply rotating the base film BF laminated to the light transmitting panel by a motor and passing the same through a bonding device P having a pressing drum P1 arranged on a table P2 (see FIG. 5).

Light emitting components of a light emitting ink composition for the light guide pattern 70 may be made of those of a conventional light guide sheet, for example, ceramic particles such as titanium oxide or glass.

In addition, acrylic or silicone having adhesive properties may be used, or any one may be selected and used from among a urethane-based resin, a polysynthetic resin, a urethane-vinyl-based synthetic resin, etc. These materials preferably have the property of being printed in a liquid or paste form and cured in a gel form, exhibit repeatable adhesion similar to known post-it notes, and have natural curing or UV curing characteristics to ensure the stability of the bonding state of the back sheet BS and the light transmitting panel.

In addition, the back sheet BS is preferably separately produced/sold in a form in which a release paper is attached to a surface on which the light guide pattern 70 is formed.

In addition, as a method of printing a pattern with luminescent ink on the base film BF, especially the reflective film, a roll-type printing technique may be used, which is disclosed in Korean Utility Model Registration No. 20-0451991 (registration date: Jan. 18, 2011) with the title "APPARATUS FOR MAKING REFLECTION SHEET HAVING LIGHT GUIDANCE PATTERN".

The present disclosure is characterized by further including the line printing unit 80 to enable long-term storage of the back sheet BS while maintaining the adhesive strength thereof when manufacturing and storing the back sheet BS in a roll form as described above, so each configuration will be described hereinafter in more detail with reference to FIGS. 1A to 4.

Prior to describing the line printing portion 80, the above-mentioned light guide pattern 70 will be described. The light guide pattern 70 is formed on a surface of the base film BF and is composed of a plurality of identical patterns. When a portion where the light guide pattern 70 is formed is referred to as a pattern forming portion, the line printing portion 80 extends from the edge of the pattern forming portion or is formed adjacent to the edge of the pattern forming portion. More precisely the line printing portion 80 is provided at at least one position on the pattern forming portion.

Considering that the back sheet BS is manufactured in a roll form, it is more preferable that the line printing portion 80 is provided at each of opposite sides of the back sheet BS in the longitudinal direction of the back sheet BS.

The line printing portion 80 has adhesive properties, and may be formed using a separate adhesive tape having adhesive strength similar to post-it notes, but considering manufacturing convenience, etc., it is preferably formed by a method of printing ink mixed with an adhesive as in the case of the light guide pattern 70.

In this case, the line printing portion 80 may have a higher (stronger) adhesive strength than the light guide pattern 70, so that a release paper AF attached to the base film BF is completely adhered to the base film BF so as not to be separated therefrom.

In addition, the line printing portion 80 may be formed to be inwardly spaced apart from the edge of the base film BF, so that when attached to the base film BF, the release paper is attached from the line printing portion 80 without being attached to the edge of the base film BF, thereby improving adhesiveness.

Figure 2A:
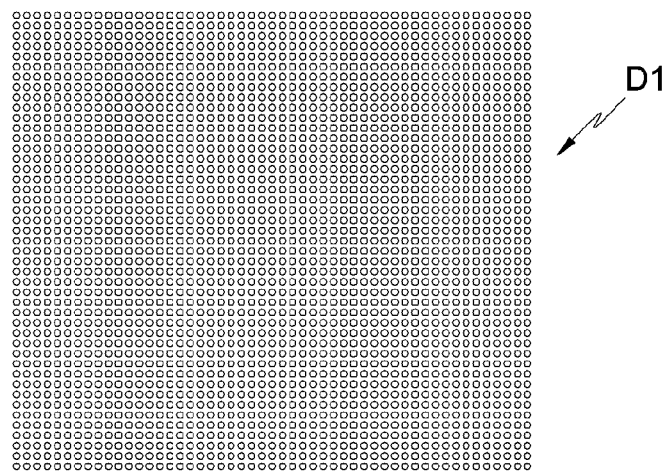
FIGS. 2A, 2B, 2C and 2D are views illustrating a dot-type embodiment of the rollable back sheet for the light emitting device according to the present disclosure.
Figure 2B:
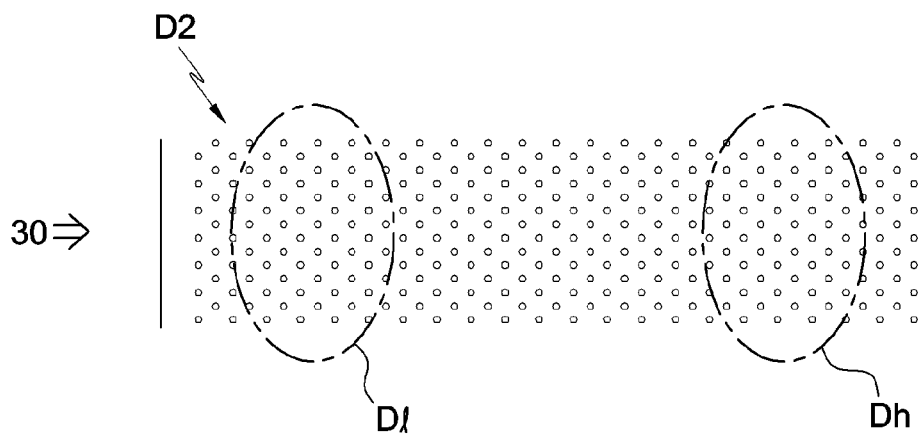
Figure 2C:
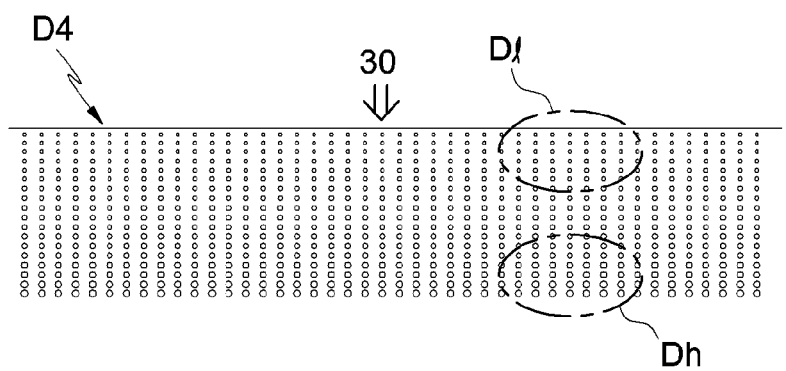
Figure 2D:
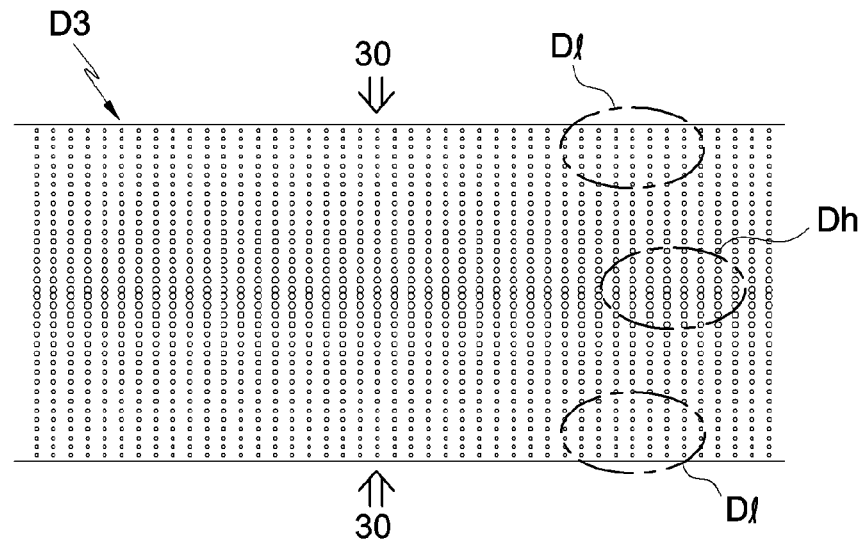

The light guide pattern 70 will be described in more detail with reference to FIGS. 2A and 3B. The light guide pattern 70 may be a dot-type pattern D1, D2, D3, and D4 or a grid-type pattern L1 and L2, and preferably has a density that increases as the distance thereof from a light emitting member increases so that light emitting from the light source has a uniform luminance distribution over the entire light emitting device.

A first dot-type pattern D1 of the light guide patterns 70 is a dot-type pattern having the same density per unit area of the base film BF, and is composed of a plurality of pseudo-circles (quadrangles with rounded corners) or a plurality of circles, which are arranged adjacent to each other.

The second dot-type pattern D2 is similar to the first dot-type pattern D1, and is composed of a plurality of pseudo-circles or a plurality of circles, which have a smaller diameter than those of the first dot-type pattern D1 so that there is a difference in density per unit area.

More specifically, the second dot-type pattern D2 is in a form in which the number of pattern elements per unit area is gradually increased, the third and fourth dot-type patterns D3 and D4 are in a form in which the individual size of each pattern element is gradually increased, and the second and fourth dot-type patterns D2 and D4 are in a form in which a low-density portion Dl is positioned at a first end thereof (where the light emitting member is provided) and a high-density portion Dh is positioned at a second end thereof.

The third dot-type pattern D3 is in a form in which a low-density portion Dl is positioned at each of opposite ends thereof (where each light emitting member is provided) and a high-density portion Dh is positioned in a center thereof.

Figure 3A:
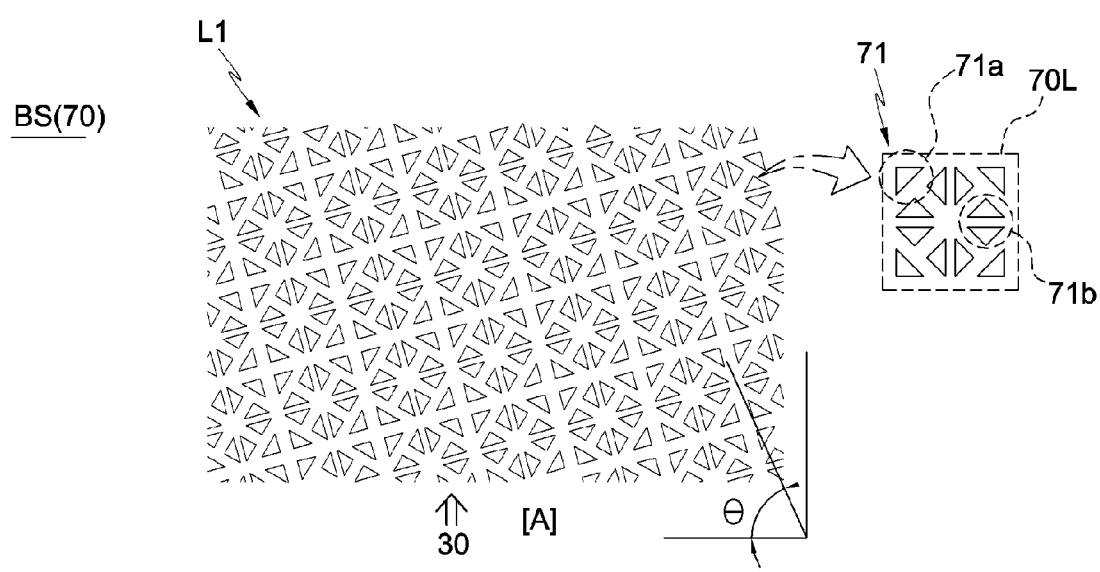
FIGS. 3A and 3B are views illustrating a grid-type embodiment of the rollable back sheet for the light emitting device according to the present disclosure.
Figure 3B:
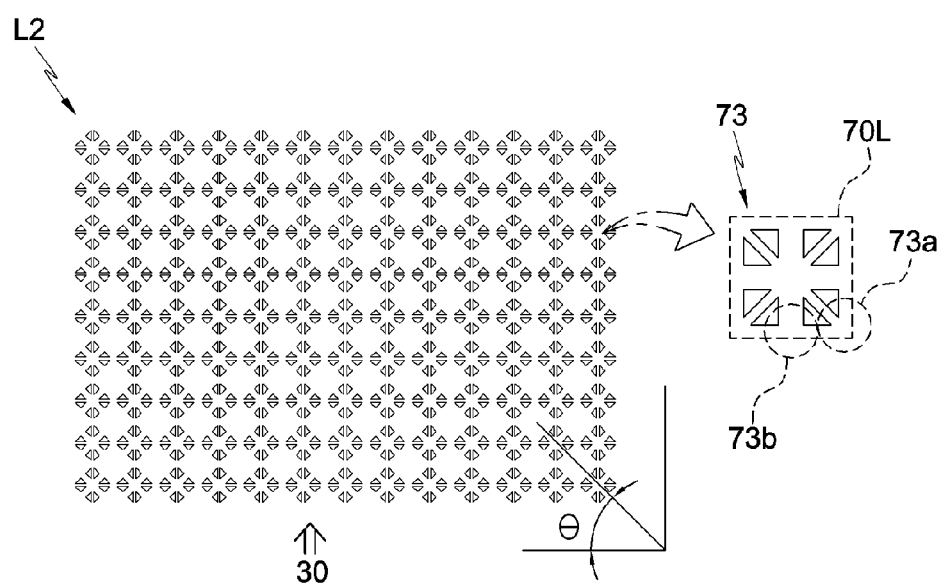

On the other hand, as illustrated in FIGS. 3A and 3B, each of the grid-type patterns L1 and L2 is composed of a plurality of pattern elements densely arranged within a quadrangular pattern contour 70L. Each of the pattern elements of the two grid-type patterns L1 and L2 has a triangle or a pseudo-triangle (with rounded corners) shape.

In the case of the first grid-type pattern L1, a pattern element constituting a corner portion 71a and a pattern element constituting a side portion 71b are separated from each other. It is preferable that the corner portion 71a is positioned at each corner of the quadrangular pattern contour 70L, and any one vertex of the triangle is positioned corresponding to a vertex of the corner portion 71a.

In addition, in the case of the first grid-type pattern L1, two pattern elements form one side portion 71b, and the side portion 71b has a rhombus shape in which the bottom sides of the two pattern element are separated from each other in parallel. A plurality of rhombus-shaped side portions 71b are provided in the quadrangular pattern contour 70L. The side portions 71b may also have a square shape depending on the side length of each pattern element.

Four side portions 71b are provided in the quadrangular pattern contour 70L. Two opposite side portions 71b at 12 o'clock and 6 o'clock positions (vertical direction) have the same shape and two opposite side portions at 3 o'clock and 9 o'clock positions (horizontal direction) have the same shape.

In other words, the two side portions 73b arranged in the horizontal direction have the same shape, and the two side portions 73b arranged in the vertical direction have the same shape, but the shapes in the horizontal direction and the vertical direction are different from each other.

Unlike the first grid-type pattern L1, in the case of the second grid-type pattern L2, a portion of one pattern element constitute a corner portion 73a, and the remaining portion thereof constitutes a side portion 73b.

In the case of grid-type patterns L1 and L2, as a result of experiments conducted by the present inventors using a light emitting device to which a back sheet BS having each of the grid-type patterns L1 and L2 is applied, it was found that even when a light source was provided at only one side of the device and the density of pattern elements was uniform without an increase or decrease, the luminance distribution was uniform over the entire device, and the luminance quality was high.

It was also found that the back sheet BS having the quadrangular pattern contour 70L had better luminance quality when it was disposed inclinedly with respect to the light source.

In other words, an angle θ at which each of the grid-type patterns L1 and L2 is disposed with respect to the light emitting member is 20 to 80 degrees, preferably 30 to 70 degrees.

Furthermore, even when the back sheet BS was attached to another back sheet BS, the light guiding performance was maintained. As illustrated in an image illustrating the junction between the first and second dot-type patterns D1 and D2, the same result was obtained in the case of the light emitting device employing the back sheets BS with the first and second dot-type patterns D1 and D2 and in the case of the light emitting device employing the back sheets BS with the grid-type patterns L1 and L2. However, it is preferable that the grid-type patterns L1 and L2 match each other at the junction thereof.

FIG. 4 and FIGS. 6 to 13 are views related to a light emitting device using the rollable back sheet BS according to the present disclosure. The light emitting device includes a frame 10; a light transmitting panel 20 provided on the frame 10, having a pattern portion, and provided with the back sheet BS having a light guide pattern 70 on a surface thereof; a light emitting unit 30 provided in the frame 10 and composed of a printed circuit board (PCB) and a light emitting member 31 to emit light to a side surface of the light transmitting panel 20; and a cover 40 detachably provided on the frame 10.

Each configuration will be described in more detail with reference to the drawings.

Figure 4:
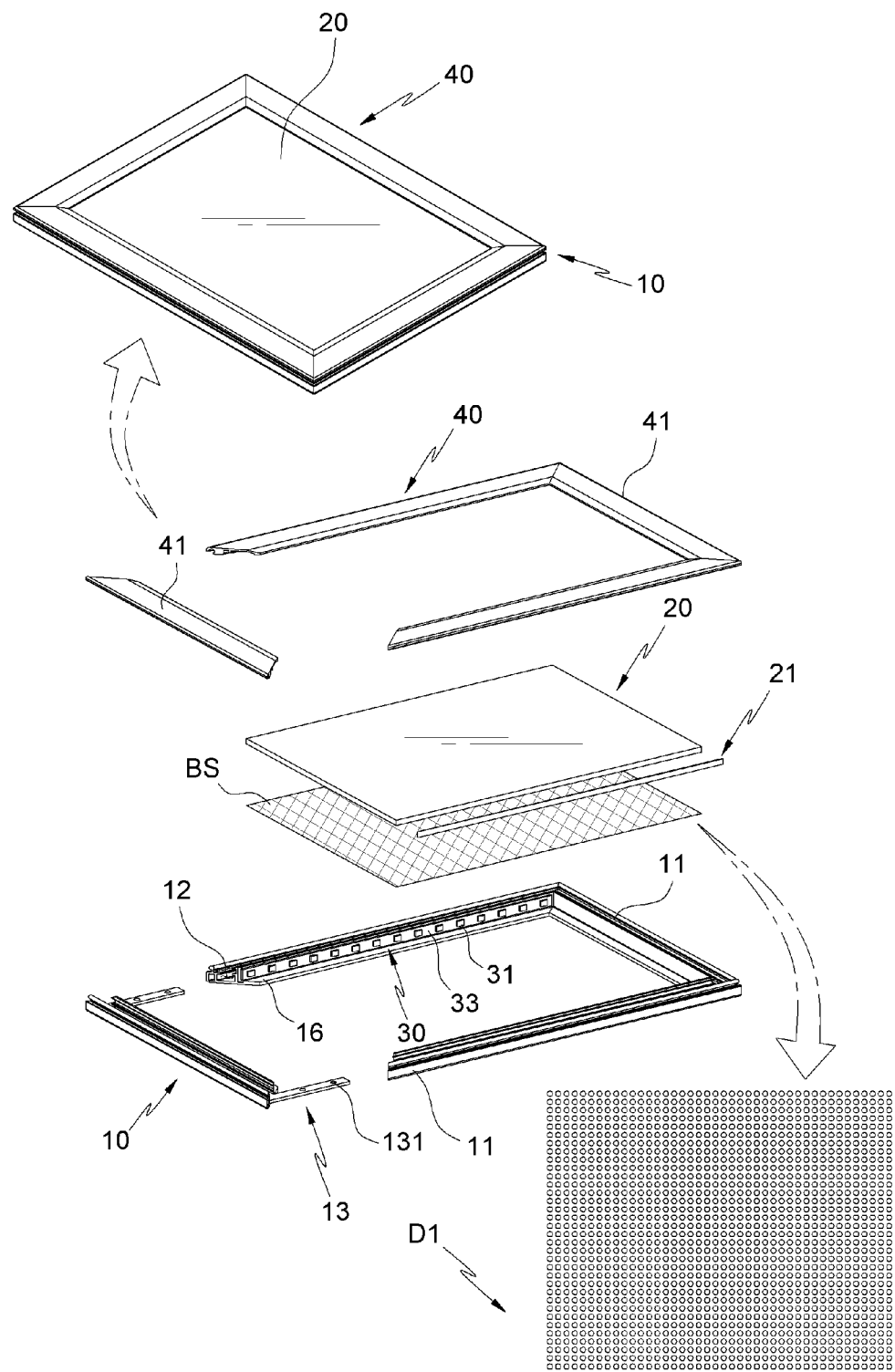
FIG. 4 is an exploded perspective view illustrating the rollable back sheet for the light emitting device according to the present disclosure and a light emitting device using the same.
Figure 6:
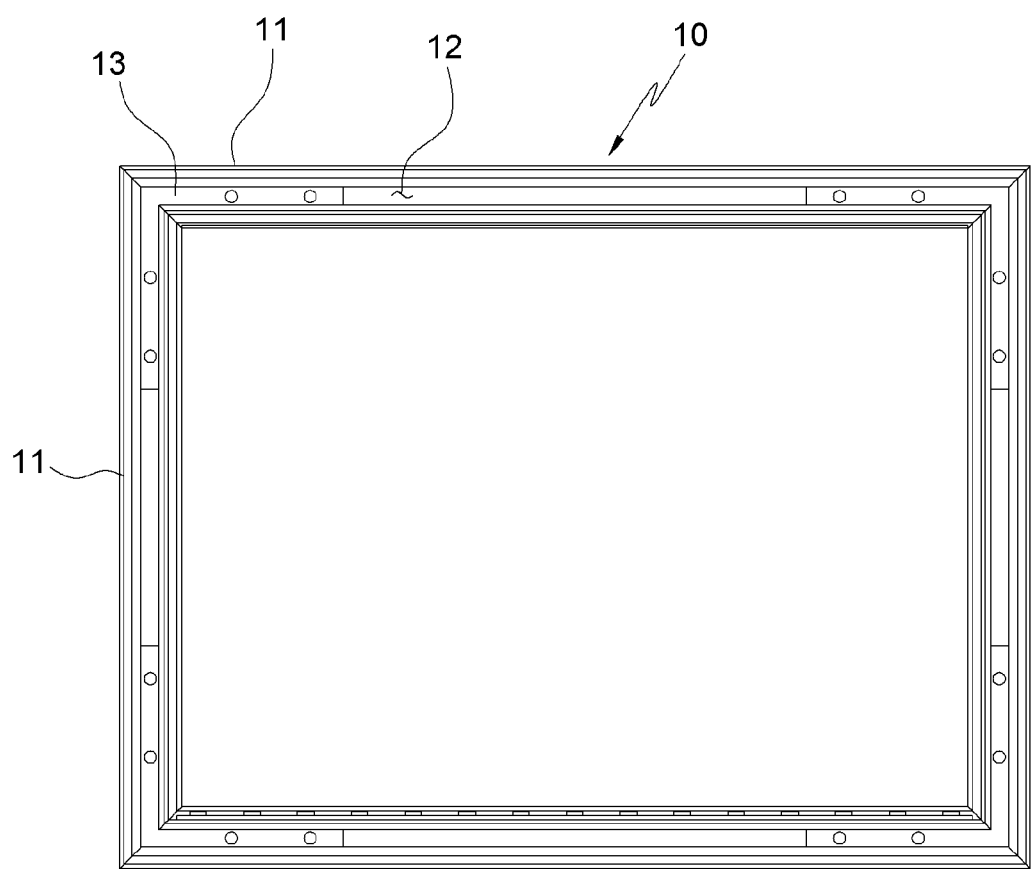
FIG. 6 is an exploded plan view illustrating the light emitting device according to the present disclosure.

The frame 10 has a quadrangular frame shape with an opening in a center thereof, and may be manufactured in the form of a single integrated body composed of four frame pieces 11. However, in order to increase assembly convenience and production convenience, as illustrated in FIGS. 4 and 6, it is preferable that the four frame pieces are separately manufactured and assembled together to form a single quadrangular frame 10.

All the four frame pieces 11 have the same shape (there may be a difference in length depending on the position thereof, i.e., horizontal and vertical positions), and for convenience of description, the side on which the cover 40 is provided is referred to as the rear, and the opposite side is referred to as the front.

A front surface of the frame 10 is formed flat so that after assembly is completed, the edge of the light transmitting panel 20 has a smooth and neat appearance that enhances the aesthetics of the panel.

Figure 7:
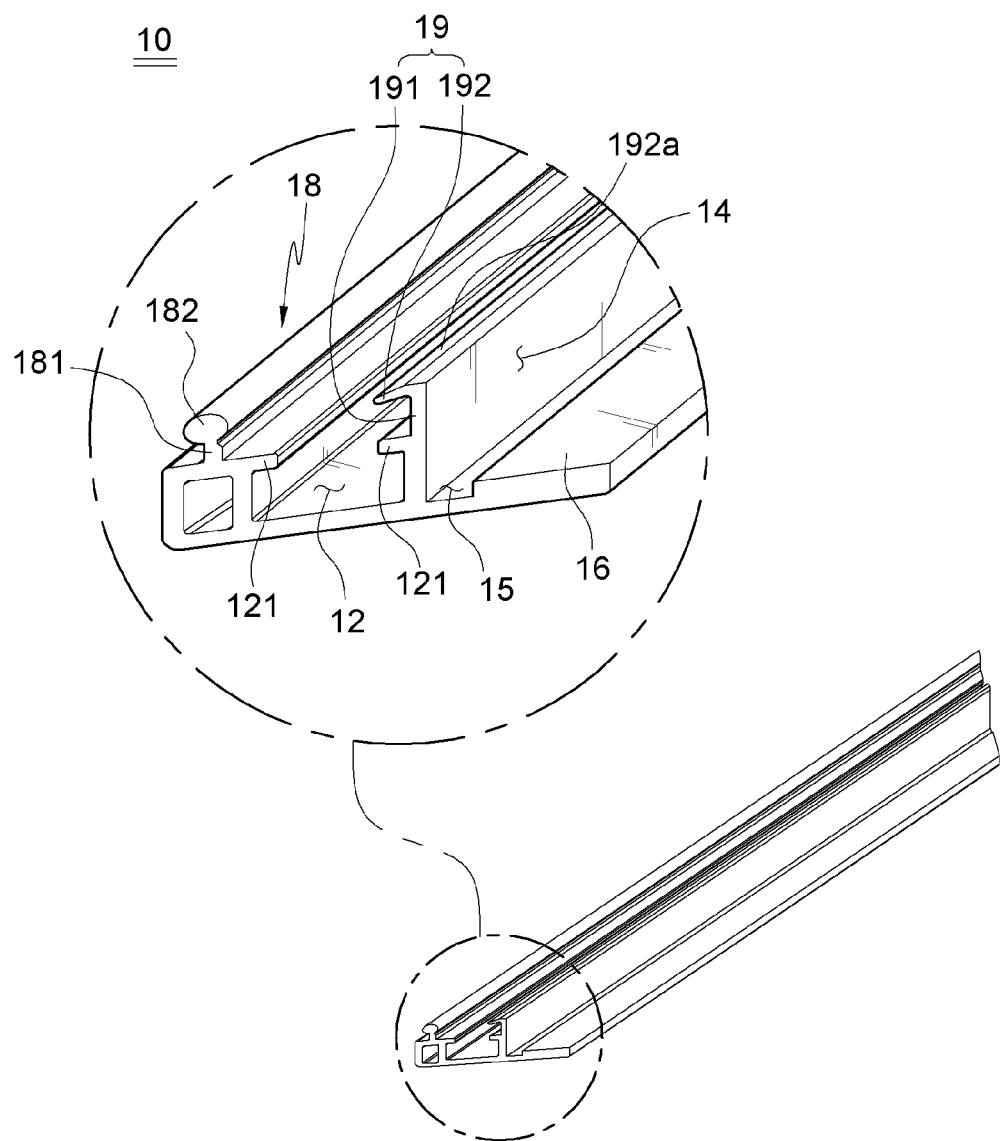
FIG. 7 is a detailed view illustrating a frame of the light emitting device according to the present disclosure.

As illustrated in FIG. 7, the frame 10 has a bracket receiving portion 12 for allowing a fixing bracket 13, which will be described later, to be inserted therein. The bracket receiving portion 12 has a rear surface provided with an anti-separation portion 121 formed by decreasing the width of the bracket receiving portion 12 so as to prevent separation of the fixing bracket 13.

The fixing bracket 13 is provided at each corner of the frame to connect the four frame pieces 11 to each other. For this purpose, as illustrated in FIGS. 6 and 7, each of the frame pieces 11 is configured to have an oblique end, and the fixing bracket 13 is configured as a rigid right angled member that fixes two adjacent frame pieces 11 while maintaining a quadrangular frame shape to thereby improve durability.

The fixing bracket 13 is a member that is inserted into the bracket receiving portion 12 in the lateral direction. During assembly, a user combines four fixing brackets 13 to the four frame pieces 11 at respective corners of the frame 10 and then applies a force to assemble the frame pieces 11 adjacent to each other. Thus, in terms of structure, it is impossible that any one of the frame pieces 11 is arbitrarily separated from the others, thereby ensuring coupling stability.

In addition, a headless bolt 131 (a general bolt may also be used) is fastened to the fixing bracket 13 in close contact with a bottom surface of the bracket receiving portion 12 so as to firmly secure the fixing bracket 13, thereby maintaining more stable coupling.

In other words, the headless bolt 131 is in close contact with the bottom surface of the bracket receiving portion 12 through the fixing bracket 13. When the headless bolt 131 is tightened, the fixing bracket 13 is prevented from moving back by the anti-separation portion 121 supporting a rear surface of the fixing bracket 13, and at the same time, the headless bolt 131 is pressed against the bottom surface of the bracket receiving portion 12 to thereby firmly secure the fixing bracket 13 to the frame piece 11.

A fixing portion 14 to which the light emitting unit 30 is secured is provided in an outer wall shape at a position inside the bracket receiving portion 12 (the position corresponding to the direction in which the light transmitting panel 20 is provided). More precisely, the fixing portion 14 is formed by a wall forming the bracket receiving portion 12 and a wall formed by a second coupling portion 19 which will be described later.

In addition, a horizontally flat panel seating portion 16 is formed inside the fixing portion 14, more precisely, on the innermost side of the frame piece 11, and the edge of the light transmitting panel 20 is seated on the panel seating portion 16 during assembly.

In this case, an adhesive member, such as a double-sided tape, may be further provided on the panel seating portion 16 for more robust fixing.

It is obvious that the light transmitting panel 20 has the pattern portion intended to be luminous, such as a pattern, a text, a design, etc. Furthermore, according to the present disclosure, a special functional coating may be applied to an outer surface of the light transmitting panel to improve scratch resistance, antifouling properties, flame retardancy, etc.

The light transmitting panel 20 is further provided with the back sheet BS. This back sheet BS is the same as the above-mentioned back sheet BS on which the light guide pattern 70 is formed, so a detailed description thereof is omitted.

When the edge of the light transmitting panel 20 is seated on the panel seating portion 16, the wall-shaped fixing portion 14 is inevitably positioned facing a side surface of the light transmitting panel 20. The light emitting unit 30 is secured to the fixing portion 14 so as to emit light toward the side surface of the light transmitting panel 20 (side light emission).

The light emitting unit 30 is composed of the light emitting member 31 configured as a light emitting diode (LED) to increase luminous efficacy, and the PCB 33 on which the light emitting member 31 is provided.

In general, a white LED and an RGB LED has a difference in width of the PCB 33 or the PCB 33 and the light emitting member 31 due to the difference in light emission mechanism. The actual width of the PCB 33 of the white LED is 5 mm, and that of the PCB 33 of the RGB LED is 8 mm. Thus, there is a related-art problem in that each frame 10 is manufactured separately so that the width of the fixing portion 14 varies depending on the type of LED.

In order to overcome such a problem, according to the present disclosure, a width extension portion 15 is further provided at the fixing portion 14 so as to enable the use of both the white LED and the RGB LED.

Figure 10A:
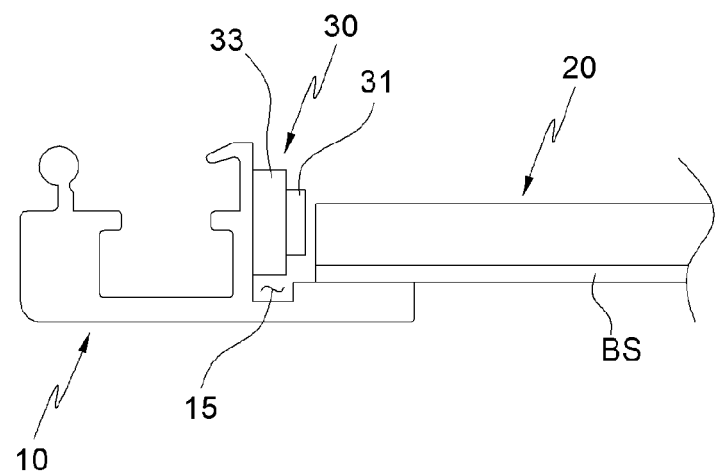
FIGS. 10A and 10B are views illustrating an embodiment of a light emitting unit of the light emitting device according to the present disclosure.
Figure 10B:
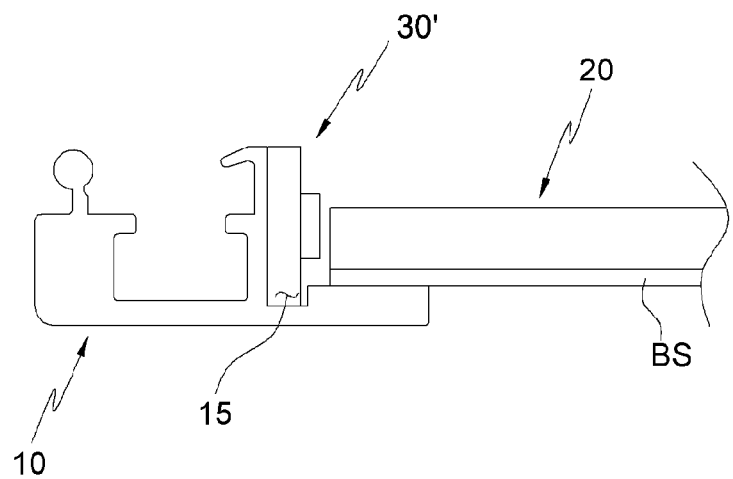

More specifically, as illustrated in FIGS. 10A and 10B, the width extension portion 15 is a groove that is formed adjacent to the fixing portion 14, and is formed at a lower position than the panel seating portion 16 on which the light transmitting panel 20 is seated. In the case of using a white LED as illustrated in FIG. 10A, a portion of the PCB 33 does not enter the width extension portion 15 so that the light emitting member 31 is positioned facing the side surface of the light transmitting panel 20. In the case of using an RGB LED as illustrated in FIG. 10B, a portion of the PCB 33 enters in the width extension portion so that the light emitting member 31 (LED chip) is positioned facing the side surface of the light transmitting panel 20 as in the case of the white LED, thereby increasing the luminous efficacy.

Figure 11:
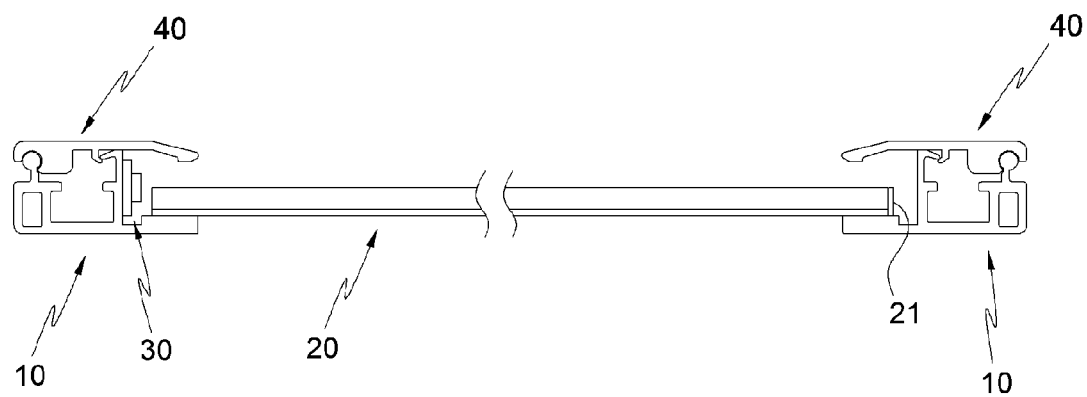
FIG. 11 is a side sectional view illustrating the light emitting device according to the present disclosure.

In addition, as illustrated in FIGS. 4 and 11, an anti-light leakage member 21 is further provided on a side surface of the light transmitting panel 20 so as to prevent light emitted from the light emitting unit 30 toward the light transmitting panel 20 from leaking to the opposite side, thereby increasing the luminous efficacy.

In other words, the anti-light leakage member 21 is provided on the side surface of the light transmitting panel 20 opposite to the direction in which light is emitted from the light emitting unit 30, and is provided using a separate adhesive member such as a double-sided tape. The anti-light leakage member 21 is preferably made of a material such as a blackout sheet capable of blocking light.

The anti-light leakage member 21 may also be provided on each side surface of the light transmitting panel 20 except for the side surface thereof toward which light from the light emitting unit 30 is emitted.

When the light emitting unit 30 is provided as described above, a cable 331 for supplying power to the light emitting unit 30 is essentially provided. It is thus obvious that the frame 10 is provided with a separate through-hole for allowing the cable 331 to pass therethrough. The through-hole is not illustrated in the drawings but can be easily inferred by those skilled in the art, so a detailed description thereof will be omitted.

When the light emitting unit 30 and the light transmitting panel 20 are provided in the frame 10 as described above, the cover 40 for preventing separation of the light emitting unit 30 and the light transmitting panel 20 is further provided. The cover 40 is composed of four cover pieces 41 to correspond to the respective frame pieces 11. The cover 40 is configured to be detachably coupled to the frame 10 in a one-touch manner to improve assembly convenience and to be removed easily during maintenance.

Figure 8:
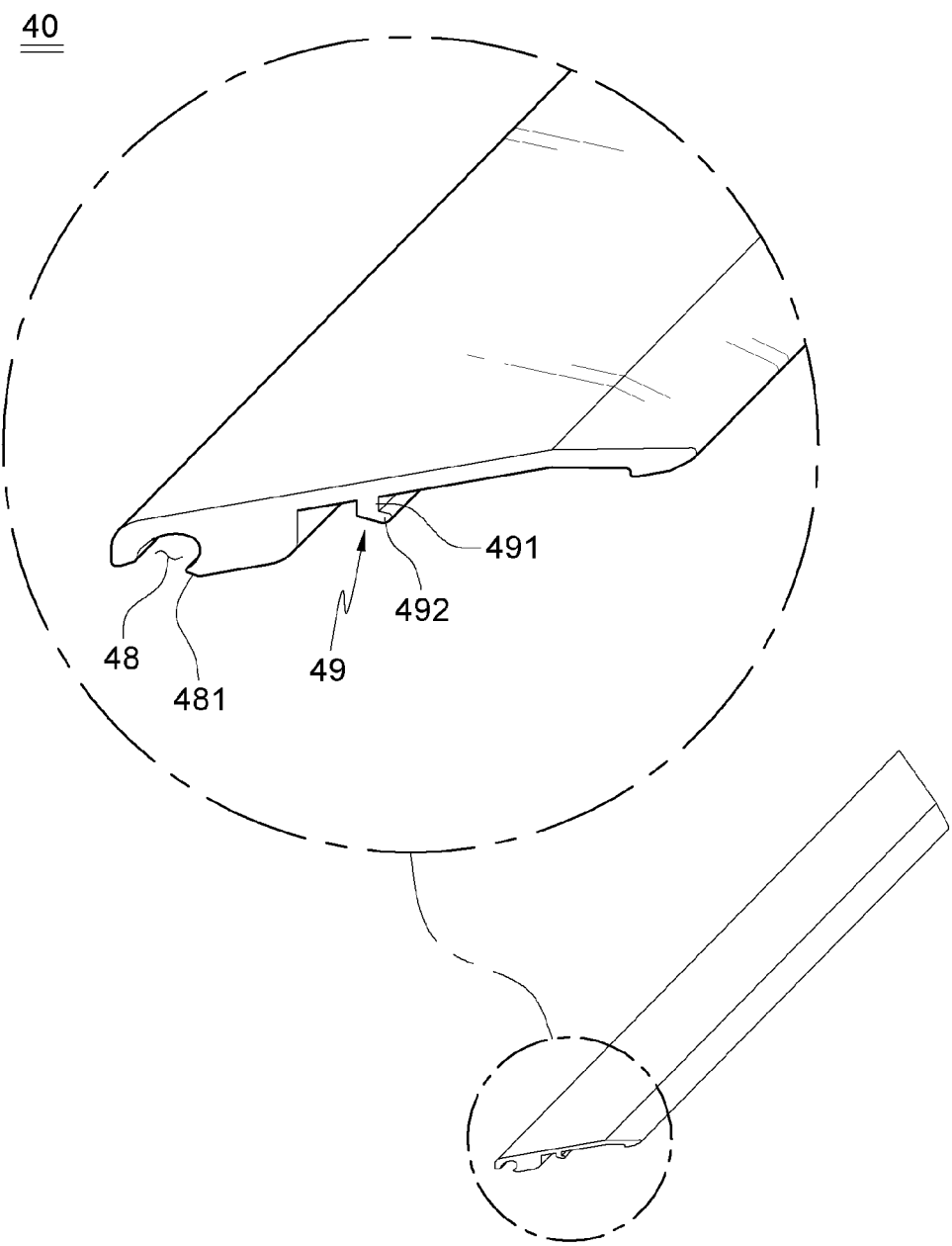
FIG. 8 is a detailed view illustrating a cover of the light emitting device according to the present disclosure.
Figure 9A:
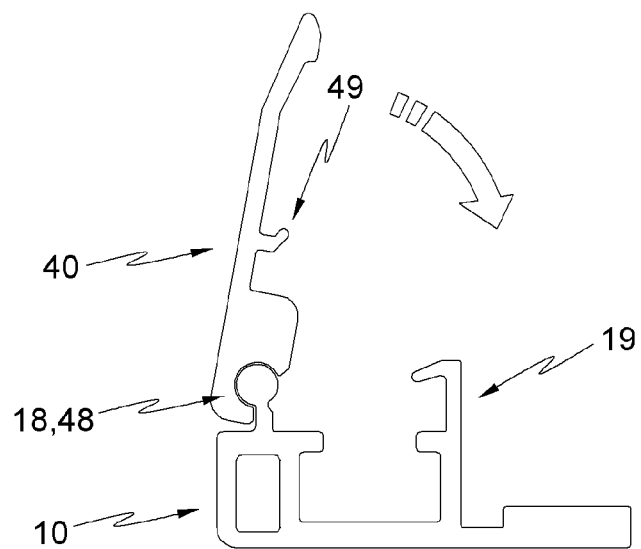
FIGS. 9A, 9B and 9C are views illustrating an embodiment for assembly of the frame and the cover of the light emitting device according to the present disclosure.
Figure 9B:
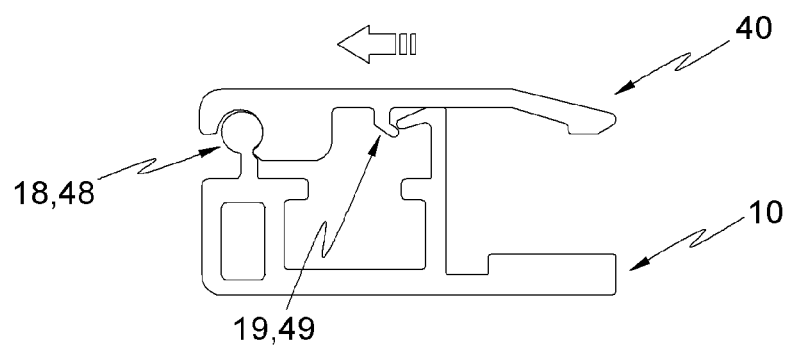
Figure 9C:
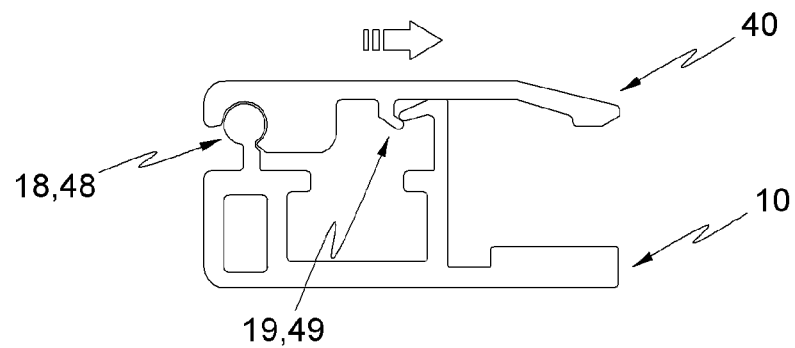

For this purpose, as illustrated in FIG. 7, the frame 10 is provided with a first coupling portion 18 and a second coupling portion 19, and as illustrated in FIG. 8, the cover 40 is provided with a first corresponding coupling portion 48 and a second corresponding coupling portion 49 coupled to the first coupling portion 18 and the second coupling portion 19, respectively, so that as illustrated in FIGS. 9A to 9C, the cover 40 is detachably coupled to the frame 10 in a one-touch manner.

Each configuration will be described in more detail. First, as illustrated in FIG. 7, the first coupling portion 18 is formed on the outer side of the frame 10 and the second coupling portion 19 is formed on the inner side thereof spaced inwardly apart from the first coupling portion 18. The second coupling portion 19 has a surface that forms the fixing portion 14 to which the light emitting unit 30 is secured.

The first coupling portion 18 is a protrusion that protrudes rearwardly from the frame 10, and is composed of a first pillar 181 and a head 182 provided at an end of the first pillar 181 and having a circular cross-section. This is designed to enable coupling and rotation of the first corresponding coupling portion 48, which will be described in detail below.

The second coupling portion 19 is composed of a second pillar 191 formed at a position spaced inwardly apart from the first coupling portion 18 and protruding rearwardly from the frame 10, and a locking portion 192 bent toward the first coupling portion 18 from the second pillar 191. The locking portion 192 has an upper end provided with an inclined portion 192a formed by decreasing the thickness of the end of the locking portion 192.

In addition, the first coupling portion 18 and the second coupling portion 19 are formed along the longitudinal direction of the frame 10. The first corresponding coupling portion 48 and the second corresponding coupling portion 49, which will be described later, are formed at positions corresponding to the first coupling portion 18 and the second coupling portion 19 along the longitudinal direction of the cover 40.

FIG. 8 illustrated the cover 40. The cover 40 has the first corresponding coupling portion 48 corresponding to the first coupling portion 18. The first corresponding coupling portion 48 is a groove that allows the head 182 of the first coupling portion 18 to be seated therein. In addition, the first corresponding coupling portion 48 is provided with an anti-separation protrusion 481 protruding outwardly from the inner side thereof. This is to prevent the cover 40 from being separated in the vertical direction when the cover 40 is coupled to the frame 10.

The shapes of the first coupling portion 18 and the first corresponding coupling portion 48 may be interchangeable.

The second corresponding coupling portion 49 is composed of a third pillar 491 protruding from the cover 40, and a corresponding locking portion 492 bent inwardly forwardly from the third pillar 491. It is preferable that the third pillar 491 and the corresponding locking portion 492 form an obtuse angle.

The shapes of the second coupling portion 19 and the second corresponding coupling portion 49 may also be interchangeable.

In addition, the first coupling portion 18 is inserted into the first corresponding coupling portion 48 so that a small gap exists between the first coupling portion and the first corresponding coupling portion 48. Hereinafter, a fixing method will be described in more detail below with reference to FIGS. 9A to 9C.

FIGS. 9A, 9B, and 9C sequentially illustrate the process of assembling the cover 40 to the frame 10. First, as illustrated FIG. 9A, the cover 40 is erected from the frame 10 and is positioned so that the first coupling portion 18 is seated in the first corresponding coupling portion 48 in the form of a groove.

Thereafter, when the inner side of the cover 40 is pressed and rotated using the first coupling portion 18 and the first corresponding coupling portion 48 as the rotation axis, the corresponding locking portion 492 is positioned on the outer side of the locking portion 192. More precisely, although not illustrated in the drawings, the front side of the corresponding locking portion 492 is positioned on the rear side of the locking portion 192.

At this time, when the user pushes the cover 40 outwardly, the cover 40 is slightly pushed due to the gap between the first coupling portion 18 and the first corresponding coupling portion 48. In this case, the overlapping width of the locking portion 192 and the corresponding locking portion 492 is preferably 0.1 mm.

This is a width sufficient to allow the corresponding locking portion 492 to pass behind the locking portion 192 even with the application of little force. When the user applies more force to allow the end of the corresponding locking portion 492 to pass behind the end of the locking portion 192 as illustrated in FIG. 9[B] and then removes the applied force, the cover 40 is moved inwardly to become a state as illustrated in FIG. 9[C], and preferably, the end of the corresponding locking portion 492 is positioned on the front end (the lower end in the drawings) of the locking portion 192. As a result, the overlapping width of the locking portion 192 and the corresponding locking portion 492 is changed to 0.2 mm, thereby preventing the cover 40 from being arbitrarily separated.

In addition, the inclined portion 192a formed on the upper end of the locking portion 192 allows the corresponding locking portion 492 to pass behind the locking portion 192 more easily. When removing the cover 40, the obtuse angle between the third pillar 491 and the corresponding locking portion 492 allows the corresponding locking portion 492 to pass behind the locking portion 192 more easily. This enables easy and convenient assembly work.

The present disclosure further includes a light blocking member DS on a rear surface of the frame 10 so as to completely block light leakage.

As described above, the present disclosure is characterized in that the four frame pieces 11 are connected to each other and the corresponding four covers 40 are assembled thereto. This is disadvantageous, however, a gap exists between adjacent cover pieces 41, causing leakage of light. In order to overcome this problem, as illustrated in FIG. 12[A], an adhesive light blocking member DS is further provided at each corner of the cover 40 composed of the four cover pieces 41 so as to completely block light from leaking through the gap between the adjacent cover pieces 41.

Figure 12A:
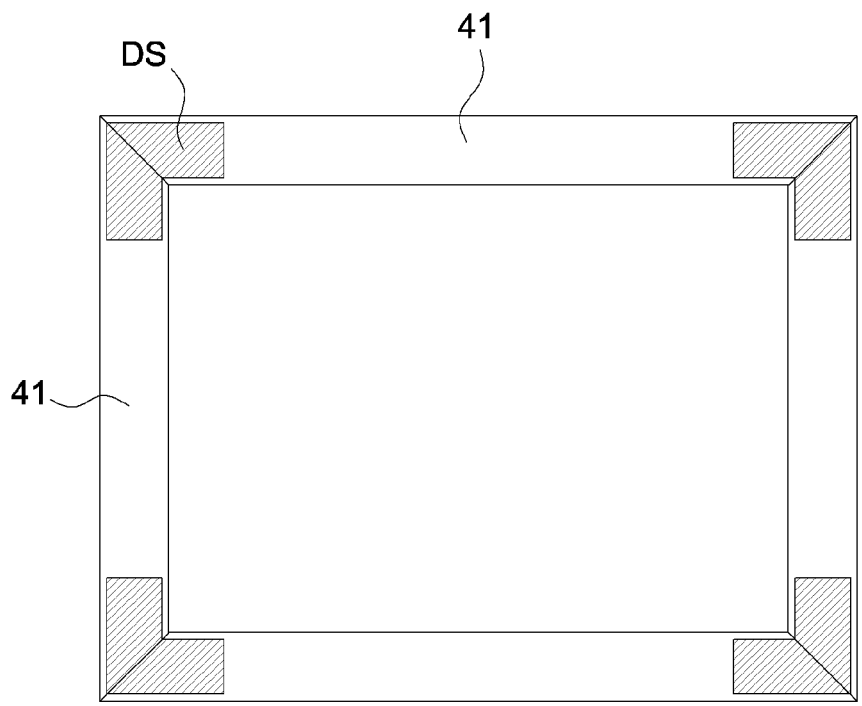
FIGS. 12A, 12B and 13 are views illustrating an embodiment of the light emitting device according to the present disclosure.
Figure 12B:
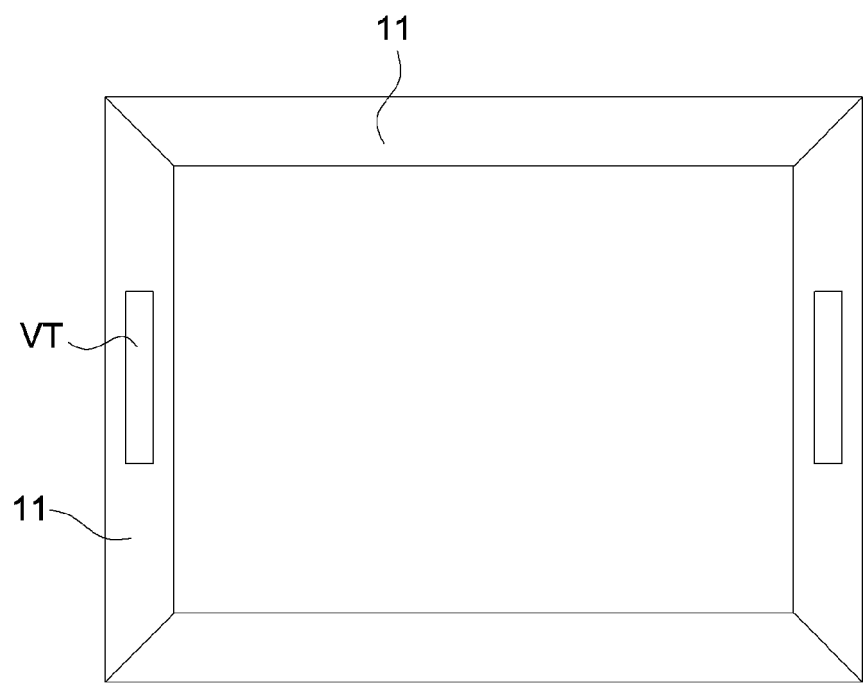

In addition, as illustrated in FIG. 12[B], the present disclosure further includes an attachment member VT on a front surface of the frame 10 so as to enable the user to easily attach the frame 10 to an installation surface. The attachment member VT is preferably a Velcro tape providing a male or female part. However, this is only one embodiment, and other methods using such as magnets, tape, etc. may be used.

Figure 13:
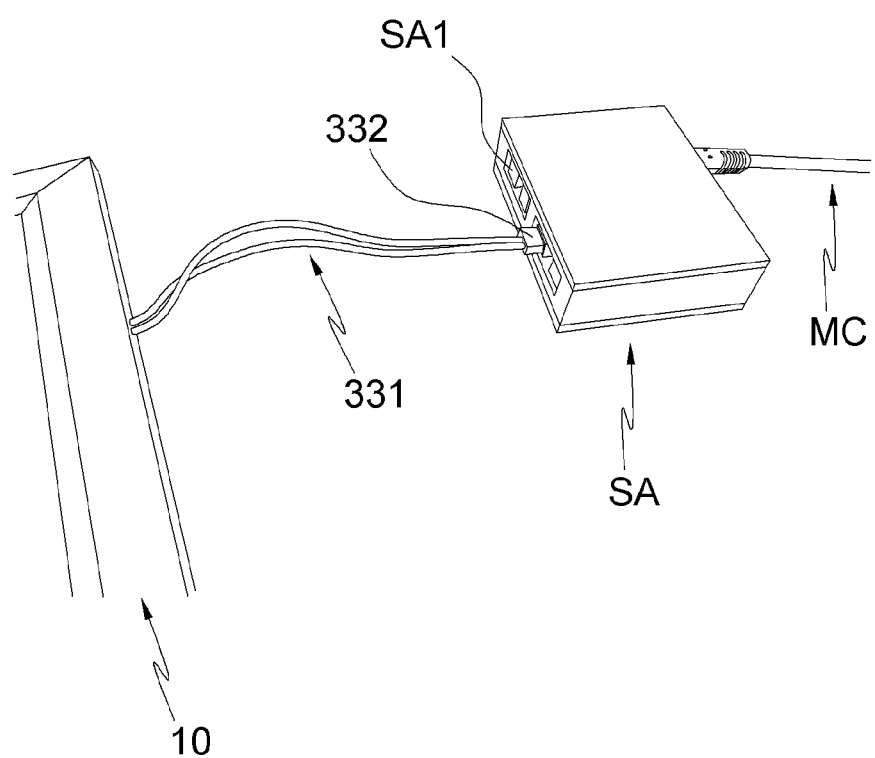

The above-mentioned cable 331 connected to the light emitting unit 30 is a jack by jack type. As illustrated in FIG. 13, the present disclosure further includes a separate auxiliary adapter SA for power supply. The auxiliary adapter SA may be connected to a main power supply to directly transmit electricity supplied from the main power source, or may have a charging unit therein to charge the electric energy supplied from the main power source so as to supply electricity to the light emitting unit 30 without main electricity supply.

For this purpose, the auxiliary adapter SA is provided with a terminal portion SA1 for allowing a jack 332 of the cable 331 to be inserted therein. A plurality of terminal portions SA1 are provided so that a plurality of light emitting devices can emit light simultaneously. A main cable MC that is connected to the main power source is further provided, and although not illustrated in the drawings, it is obvious that a main cable MC terminal to which the main cable MC is coupled is further provided.

The auxiliary adapter SA is further provided with a control module for controlling the light emitting unit 30. The control module may control ON/OFF, dimming, timer functions, etc. of the light emitting unit 30.

Here, the timer function may include ON/OFF time setting, light emission holding time setting, etc.

The dimming function is a function of controlling the brightness of the light emitting unit 30, and includes not only simple brightness control, but also brightness control according to a specific rule.

In the case of RGB LEDs, color change rules, etc. may be further set.

The auxiliary adapter SA is further provided with a wireless transceiver so as to remotely control the control module through a user's mobile device. The user can remotely control the control module from the mobile device through the wireless transceiver to set power ON/OFF, dimming, timer functions, etc. of the light emitting unit 30. For this purpose, it is obvious that a separate app for controlling the control module is additionally installed on the user's mobile device.

Figure 14:
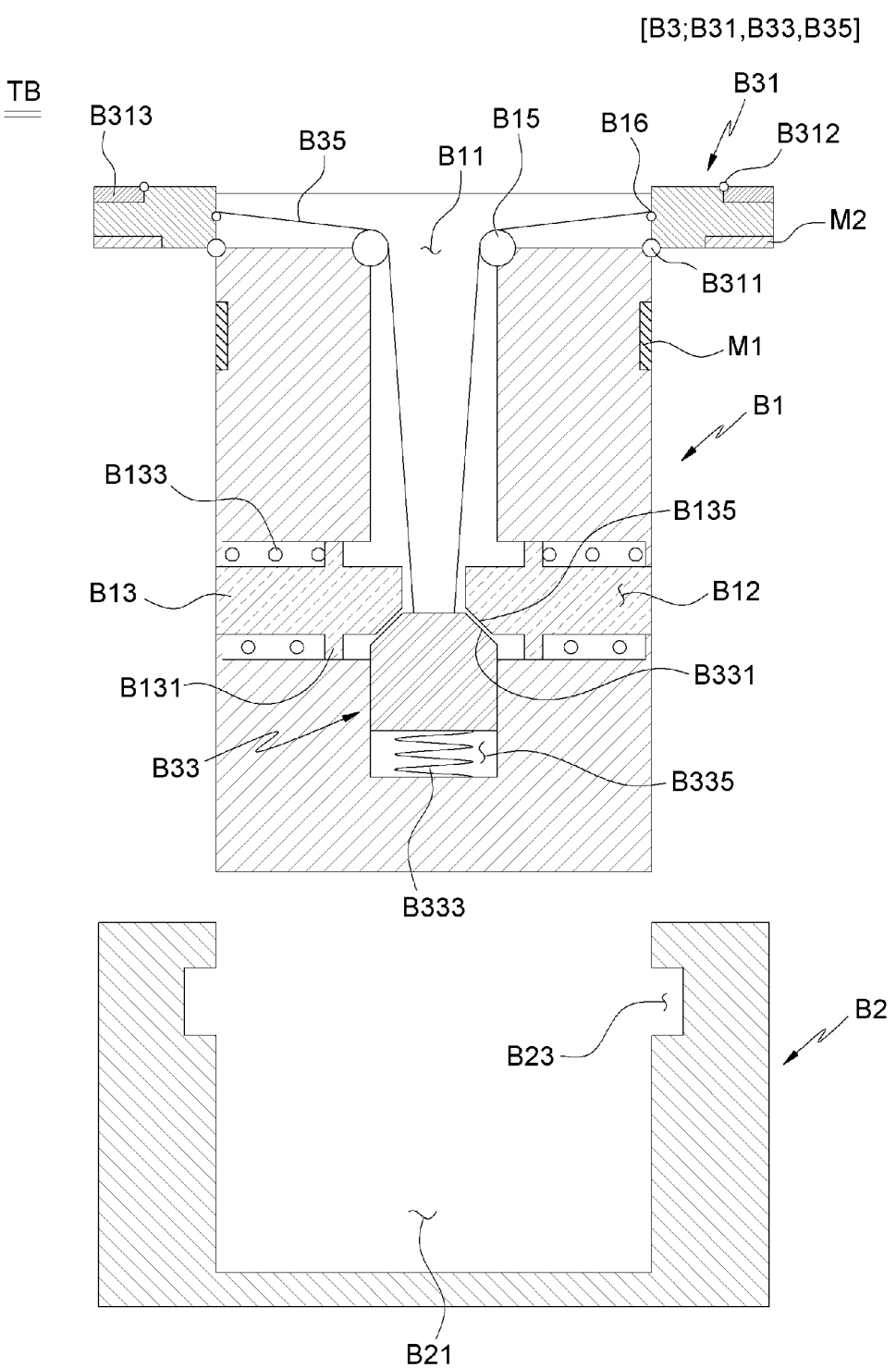
FIGS. 14 and 15 are views illustrating modified examples of the light emitting device according to the present disclosure.

FIG. 14 illustrates a modified example according to the present disclosure, and more precisely relates to a one-touch coupling block that is another modified example of the attachment member VT.

Figure 15:
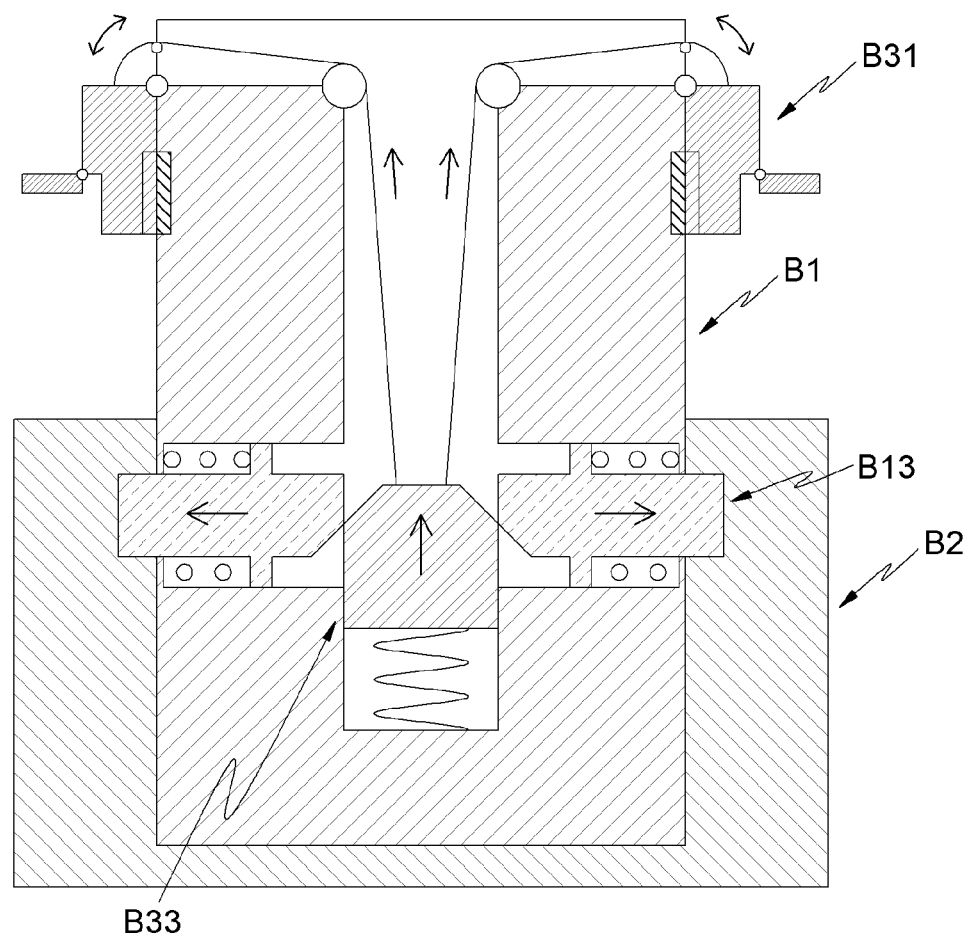

As illustrated in FIGS. 14 and 15, the one-touch coupling block TB includes: a first block B1 provided on an installation surface (usually may be a pillar of a building) and having a pair of fixing arms B13 protrudable therefrom in opposite directions; a second block B2 provided on a side surface of the frame 10 and having a fitting recess B21 allowing the first block B1 to be fitted therein and a pair of insertion recesses B23 provided in the fitting recess B21 and allowing the fixing arms B13 to be inserted therein; and an anti-retraction means B3 including an anti-retraction weight B33 provided in the first block B1 and preventing retraction of the fixing arms B13, a pair of handles B31 hinged to the first block B1 and inducing lifting and lowering of the anti-retraction weight B33, and a wire B35 connecting the handle B31 and the anti-retraction weight B33 to each other.

When the first block B1 is inserted into the fitting recess B21 and then the handles B31 are operated, the anti-retraction weight B33 is moved to a position between the pair of fixing arms B13, causing the pair of fixing arms B13 to be inserted into the insertion recesses B23 to thereby secure the first block B1 to the second block B2. Thus, the retraction of the pair of fixing arms B13 is not allowed by the anti-retraction weight B33 positioned between the pair of fixing arms B13.

Each configuration will be described in more detail with reference to the drawings.

First, although not illustrated in detail in the drawings, each of the first block B1 and the second block B2 is configured as a quadrangular block.

The second block B2 is provided on an installation surface, and has the fitting recess B21 in a center thereof to allow the first block B1 to be fitted therein, and the insertion recesses B23 at opposite sides of the fitting recess B21. The insertion recesses B23 are provided at positions corresponding to the fixing arms B13 when the first block B1 is fitted into the fitting recess B21.

The first block B1 is a quadrangular block as described above and has a lower portion inserted into the fitting recess B21. As illustrated in the drawings, the first block B1 has a T-shaped space B11 formed in a center thereof, a path B12 being in communication with the T-shaped space B11 and open at opposite sides of the first block B1, and a receiving portion B335 formed in a center of the path B12 and provided therein with the anti-retraction prevention weight B33 which will be described later.

The fixing arms B13 will be described first. The fixing arms B13 are provided in the first block B1 so as to be protrudable therefrom in opposite directions. The fixing arms B13 are provided in the path B12, and is configured to protrude oppositely from the first block B1 by the operation of the anti-retraction weight B33 so as to be inserted into the insertion recesses B23.

A support wing B131 is further provided on the outside of each of the fixing arms B13. An return elastic body B133 surrounding the fixing arm B13 is provided between the support wing B131 and the edge of the first block B1 and exerts an elastic force on the fixing arm B13 to return the same inwardly of the first block B1. This ensures that when the first block B1 is inserted into or removed from the second block B2, the fixed arm B13 does not protrude, thereby facilitating the insertion and removal operation.

A corresponding inclined portion B135 is further provided at an inner end of the fixing arm B13 and allows the anti-retraction weight B33, which will be described later, to naturally push the fixing arm B13 outwardly.

The handles B31 are further provided at opposite sides of the first block B1, more precisely, at opposite sides of an upper portion (on the upper side in FIG. 14) of the first block B1. The handles B31 are one configuration of the anti-retraction means B3, and the anti-retraction means B3 will be described in more detail below.

The anti-retraction means B3 includes the anti-retraction weight B33 provided in the first block B1 and preventing retraction of the fixing arms B13 after allowing the fixing arms B13 to protrude in opposite directions, the handles B31 hinged to the first block B1, and the wire B35 connecting the handles B31 and the anti-retraction weight B33 to each other.

The anti-retraction weight B33 is received in the receiving portion B335 as described above, and is positioned below the pair of fixing arms B13 in a state as illustrated in FIG. 14. An inclined portion B331 making close contact with the corresponding inclined portion B135 is provided at an end of the anti-retraction weight B33. A compression spring B333 for supporting the anti-retraction weight B33 is further provided in the receiving portion B335.

The compression spring B333 is a spring that exerts an elastic force in the direction of returning the anti-retraction weight B33. Here, the restoring direction means the position of the anti-retraction weight B33 in a state where the fixing arms B13 do not protrude, as illustrated in FIG. 14.

Thus, as illustrated in FIG. 15, when the anti-retraction weight B33 is moved to a position between the pair of fixing arms B13, the fixing arms B13 are naturally pushed and protrude oppositely from the first block B1 as the inclined portion B331 and the corresponding inclined portion B135 slide relative to each other. As long as the position of the anti-retraction weight B33 does not change, the fixing arms B13 are not allowed to retract inwardly, so that the fixing force between the first block B1 and the second block B2 can be kept stable.

Each of the handles B31 is a member that is hinged to each of the opposite sides of the upper portion (on the upper side in FIG. 14) through a first hinge B311. As illustrated in FIG. 15, each of the handles B31 may be rotated to a position where a surface thereof makes close contact with a side surface of the first block B1.

The handles B31 are members that control the movement of the anti-retraction weight B33, the handles B31 and the anti-retraction weight B33 are connected to each other by the wire B35. In order to prevent damage to the wire B35, a first roller B15 is provided at an inner corner of the T-shaped space B11 to support the wire B35, and a second roller B16 is provided at an end of the T-shaped space B11, i.e., a portion thereof where the wire B35 is exposed.

With the above configuration, as illustrated in FIG. 15, when the first block B1 is inserted into the second block B2 and then the pair of handles B31 are rotated to the closed position, the wire B35 is pulled to move the anti-retraction weight B33. This movement of the anti-retraction weight B33 causes the pair of fixing arms B13 to protrude oppositely from the first block B1 and be inserted into the insertion recesses B23, thereby preventing the first block B1 from being separated from the second block B2.

At this case, in order to maintain the rotated state of the handles B31, the first block B1 and each of the handles B31 respectively have a magnet M1 and a second magnet M2 on respective surfaces thereof that are in contact with each other in the closed position of the handles B31. The magnets M1 and M2 enable the first block B1 and the handles B31 to be attracted and held in position, thereby preventing the handles B31 from being arbitrarily returned from the closed position to the opened position and thus preventing the anti-retraction weight B33 from being returned to the initial position thereof.

In addition, in order to remove the first block B1 from the second block B2, it is necessary to rotate the handles B31 to be returned to the opened position. However, it is difficult for the user to rotate the handle B31 because the first block B1 is firmly attached to the first block B1 by magnetism. In order to overcome this, each of the handles B31 is further provided with a holding handle B313 hinged to a second hinge B312.

Thus, as illustrated in FIG. 15, after rotating the respective holding handles B313, the user can easily rotate the handles B31 to the opened position while holding the holding handles B313 in his or her hands. When the handles B31 are rotated and returned to the opened position, as illustrated in FIG. 14, the anti-retraction weight B33 is returned to the initial position thereof into the receiving portion B335 by the elastic restoring force of the compression spring B333 supporting the anti-retraction weight B33, and the pair of fixing arms B13 are allowed to be retracted inwardly of the first block B1 by the elastic force of the return elastic body B133, thereby maintaining a state where the first block B1 can be removed from the second block B2 and removed from the installation surface.

Although exemplary embodiments of the rollable back sheet having a specific shape, structure, and configuration and a light emitting device using the same have been described above with reference to the accompanying drawings, those skilled in the art will appreciate that various modifications, additions, and substitutions are possible, without departing from the scope and spirit of the present disclosure.

The invention claimed is:

1. A rollable back sheet for a light emitting device, the rollable back sheet comprising:
   a base film;
   a light guide pattern repeatedly formed on the base film by printing with luminescent ink mixed with an adhesive, thereby having adhesiveness; and
   a line printing portion formed on the base film and configured to adhere the base film to a release paper,
   wherein the light emitting device comprises: a frame (10); a light transmitting panel (20) provided on the frame (10) and having a pattern portion; a light emitting unit (30) provided in the frame (10) and composed of a printed circuit board (PCB) (33) and a light emitting member (31) configured to emit light to a side surface of the light transmitting panel (20); and a cover (40) detachably provided on the frame (10),
   wherein the frame (10) has a first coupling portion (18) and a second coupling portion (19) spaced apart from the first coupling portion (18),
   the cover (40) has a first corresponding coupling portion (48) and a second corresponding coupling portion (49) respectively coupled to the first coupling portion (18) and the second coupling portion (19),
   the second coupling portion (19) is composed of a second pillar (191) formed at a position spaced inwardly apart from the first coupling portion (18) and protruding rearwardly from the frame (10), and a locking portion (192) bent toward the first coupling portion (18) from the second pillar (191),
   the second corresponding coupling portion (49) is composed of a third pillar (491) protruding from the cover (40), and a corresponding locking portion (492) bent inwardly forwardly from the third pillar (491),
   wherein the first coupling portion (18) is inserted into the first corresponding coupling portion (48) so that a small gap exists therebetween, so that when the cover (40) is pressed against the frame (10), as the cover (40) is pushed outwardly due to the gap, the corresponding locking portion (492) passes behind the locking portion (192) and an end of the corresponding locking portion (492) is hooked on the locking portion (192) to thereby secure the cover (40) to the frame (10), and
   the rollable back sheet is cut to a required size and used as a back sheet (BS) for the light transmitting panel (20) of the light emitting device.

2. The rollable back sheet of claim 1, wherein the line printing portion extends from an edge of a pattern forming portion on which the light guide pattern of the base film is formed, or is formed adjacent to the edge of the pattern forming portion.

3. The rollable back sheet of claim 1, wherein the base film is composed of a first layer made of polypropylene (P.P), a second layer provided on a surface of the first layer and made of polyethylene terephthalate (PET), and a third layer provided on a surface of the second layer and made of P.P, which is the same material as the first layer.

4. The rollable back sheet of claim 1, wherein an anti-light leakage member (21) is further provided on the light transmitting panel (20) so as to prevent light emitted from the light emitting unit (30) toward the light transmitting panel (20) from leaking to the opposite side, the frame (10) is formed by assembling a plurality of frame pieces (11), the cover (40) is composed of a plurality of cover pieces (41) so as to correspond to the plurality of frame pieces (11), wherein an adhesive light blocking member (DS) is further provided at each corner of the cover (40) so as to completely block light from leaking through a gap between adjacent cover pieces (41), and the frame (10) has a fixing portion (14) in which the light emitting unit (30) is provided, wherein a width extension portion (15) is further provided at the fixing portion (14) and is configured such that a portion of the light emitting unit (30) enters the width extension portion (15) so that the light emitting unit (30) is secured to the fixing portion (14) by controlling the position of the light emitting unit (30) depending on the type of the light emitting unit (30).

* * * * *